United States Patent
Le Van

[15] 3,677,171
[45] July 18, 1972

[54] APPARATUS FOR COOKING STRIPS OF MEAT

[72] Inventor: Wayne P. Le Van, 310 E. 44th St., New York, N.Y. 10017

[22] Filed: July 24, 1970

[21] Appl. No.: 57,904

[52] U.S. Cl..................................99/339, 99/107, 99/349, 99/355, 99/386, 99/390, 99/391, 99/400, 99/427, 99/443 C, 99/446
[51] Int. Cl. ...................................................A47j 37/00
[58] Field of Search..................99/107, 339, 349, 355, 386, 99/390, 391, 400, 443 C, 446, 427

[56] References Cited

UNITED STATES PATENTS

| | | | |
|---|---|---|---|
| 3,256,803 | 6/1966 | Nelson | 99/386 X |
| 2,807,550 | 9/1957 | Zarotschenzeff et al. | 99/386 X |
| 2,109,079 | 2/1938 | Zeigler et al. | 99/386 X |
| 3,294,011 | 12/1966 | Brunson et al. | 99/390 X |
| 2,529,253 | 11/1950 | Hoffman et al. | 99/355 X |

FOREIGN PATENTS OR APPLICATIONS

| | | | |
|---|---|---|---|
| 722,604 | 11/1965 | Canada | 99/443 |
| 1,453,785 | 8/1966 | France | 99/349 |

*Primary Examiner*—Billy J. Wilhite
*Attorney*—Irving Seidman

[57] ABSTRACT

This disclosure is directed to a method and apparatus for cooking or broiling strips of bacon or the like by conveying a plurality of strips of bacon between a pair of complementary heat pervious belts arranged to travel in unison so that the relative linear speed therebetween is maintained substantially zero. The strips so conveyed are first advanced through a steam oven or bath wherein the strips are preheated to a predetermined temperature. The preheated strips are then conveyed through a broiling oven. Subsequent to the broiling operation the cooked strips are passed through a vacuum chamber in which the liquified fat or grease is removed by evacuation. The bacon strips are then subsequently blotted on each side to further remove the grease or fat adhering thereto prior to the packaging operation.

23 Claims, 13 Drawing Figures

Patented July 18, 1972
3,677,171
4 Sheets-Sheet 1
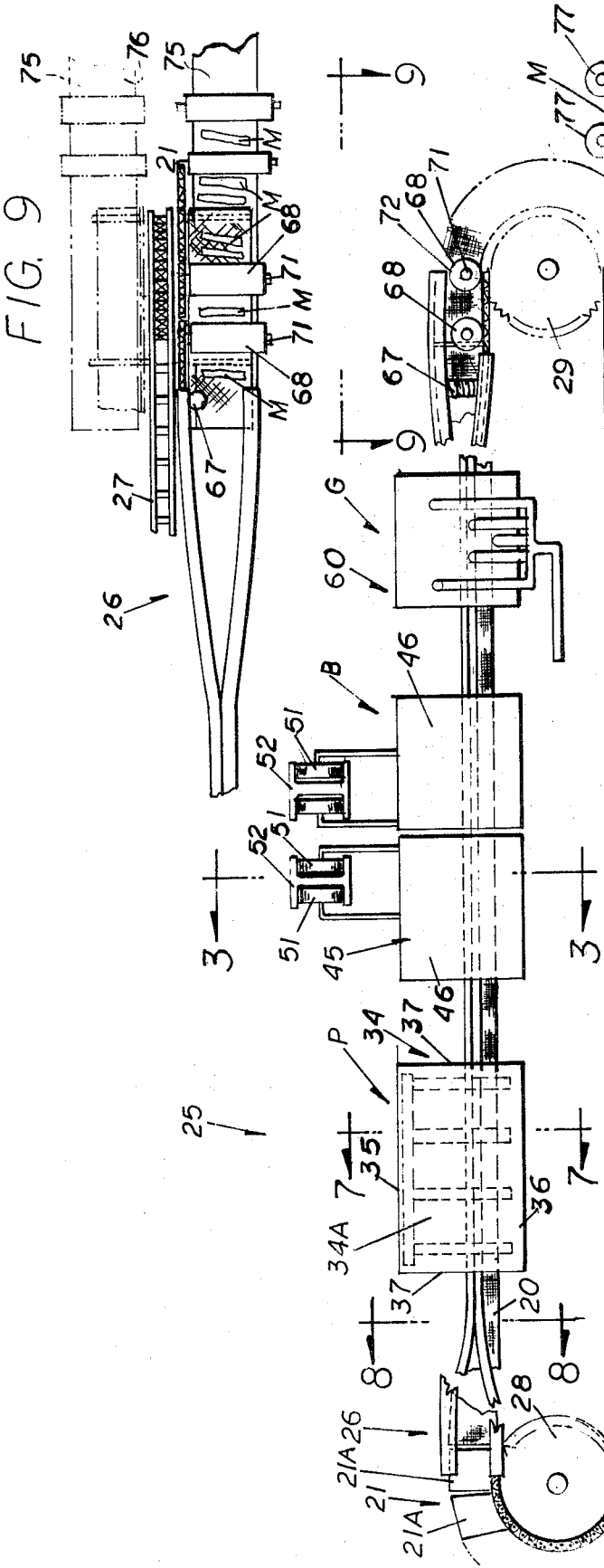
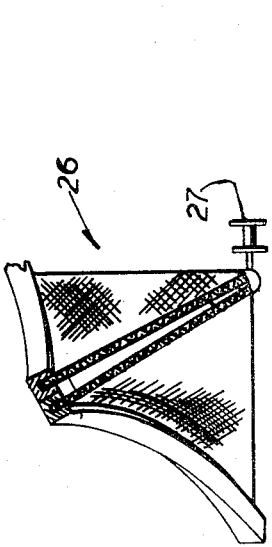
INVENTOR.
WAYNE P. LE VAN
BY
Irving Seidman
ATTORNEY Patented July 18, 1972
3,677,171
4 Sheets-Sheet 2
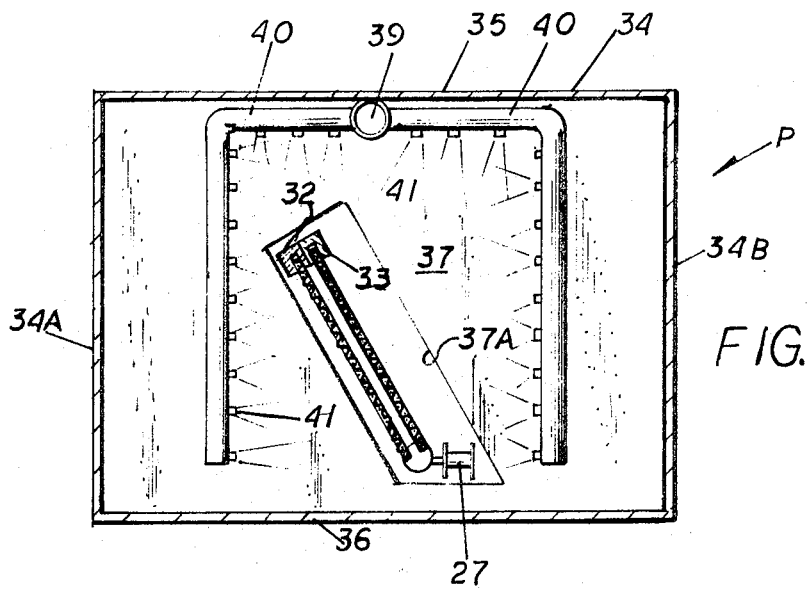
FIG. 7
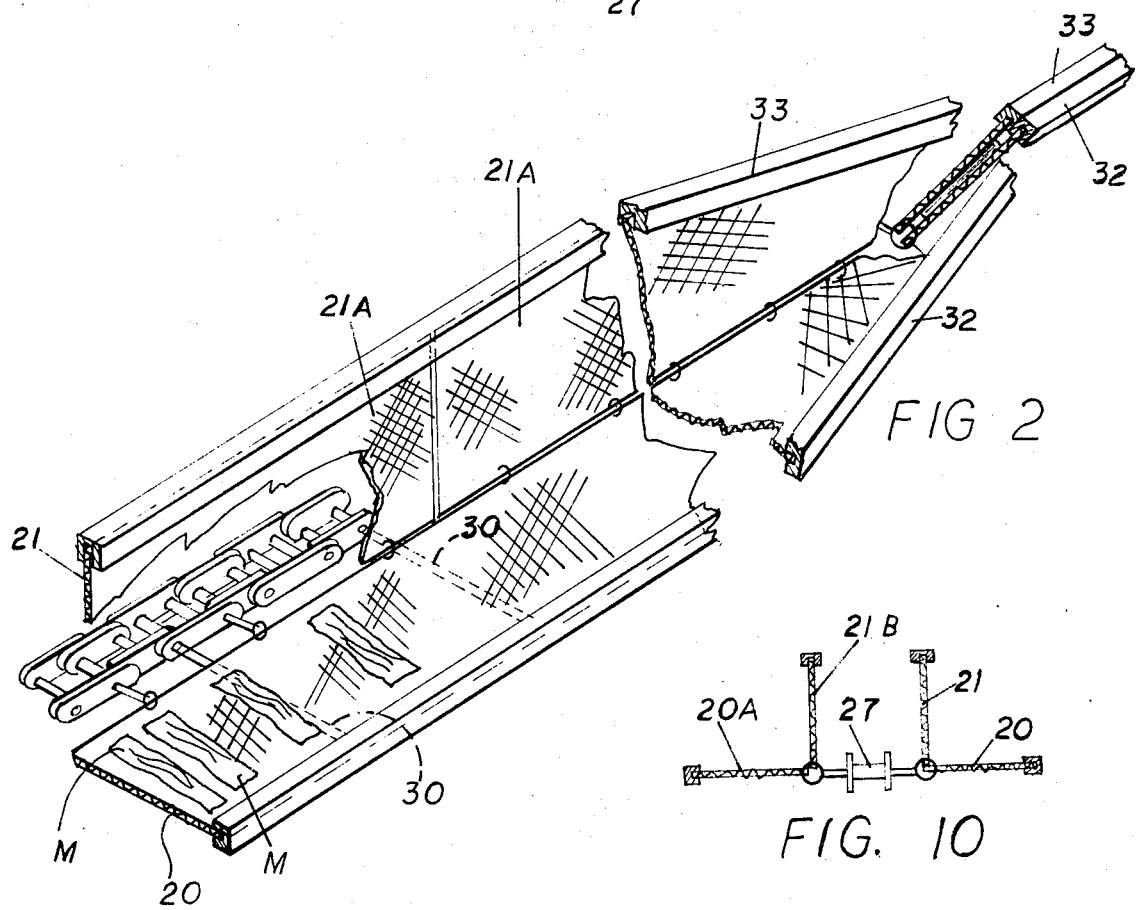
FIG. 2
FIG. 10
INVENTOR.
WAYNE P. LE VAN
BY
Irving Seidman
ATTORNEY Patented July 18, 1972
3,677,171
4 Sheets-Sheet 3
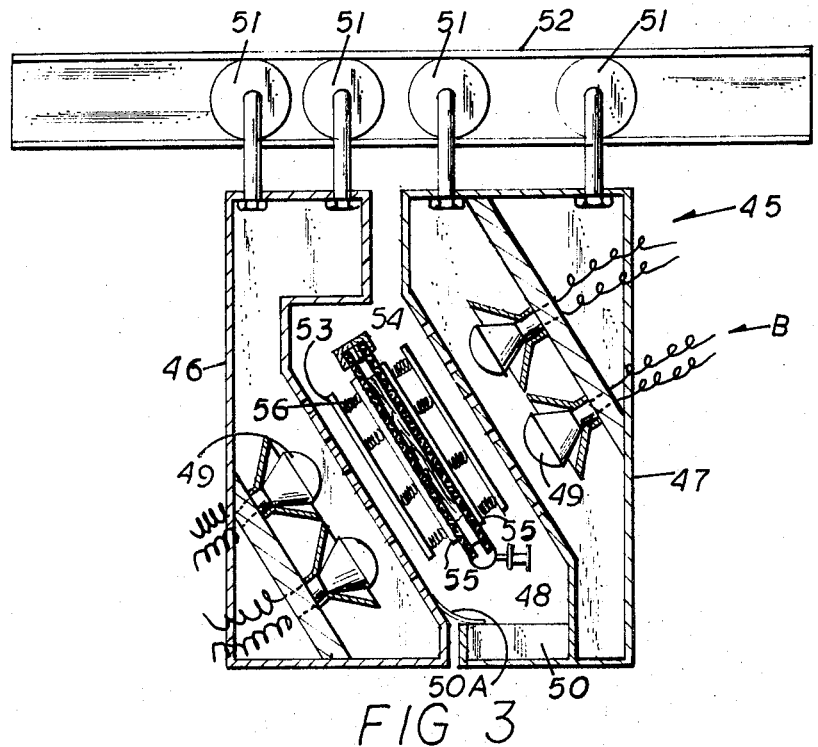
FIG 3
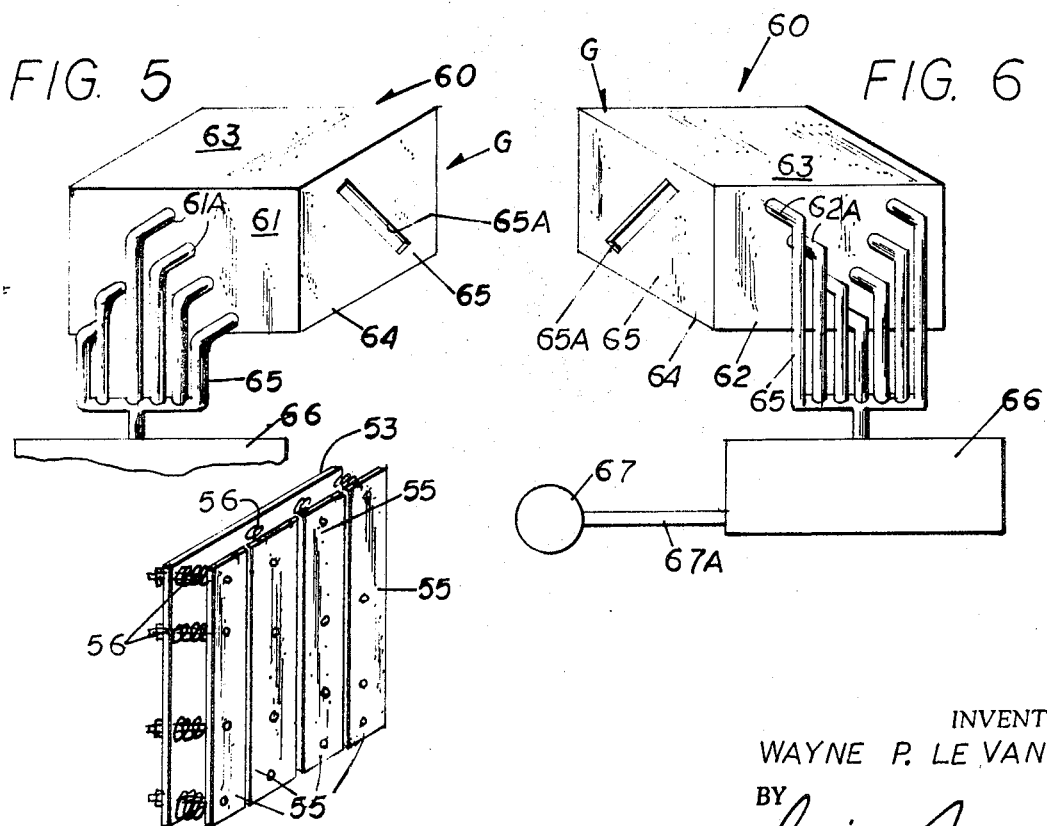
FIG. 5   FIG. 6
FIG 4
INVENTOR.
WAYNE P. LE VAN
BY
Irving Seidman
ATTORNEY

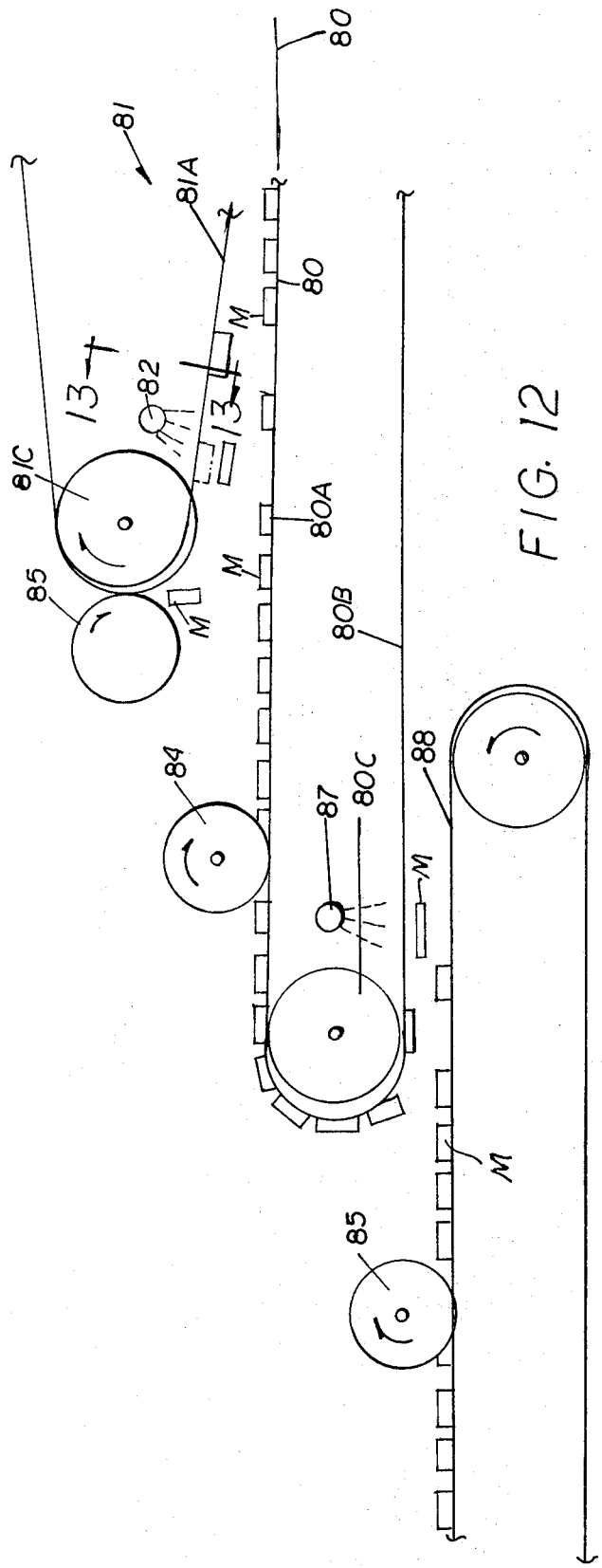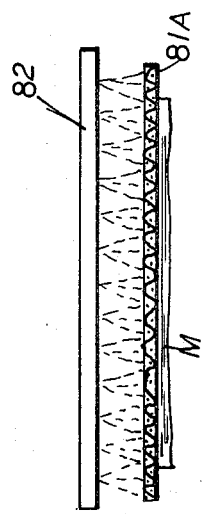

APPARATUS FOR COOKING STRIPS OF MEAT

PRIOR ART AND PROBLEM

Apparatuses for commercially broiling strips of bacon or the like are known. These known apparatuses and methods of broiling bacon strips or the like utilized a heat pervious conveyor complemented by an associated or pressure holding conveyor for sandwiching therebetween the bacon strips for conveyance through a broiling oven. Heretofore the conveyor belt and the associated holding conveyor belts were separate and independent belts which were either separately driven or driven by a common drive. However, due to the temperature differential and the different rates of thermal expansion and contraction of the respective conveyors, there resulted during the travel thereof a differential in the rate of their linear speed. The differential in the linear rate of speed of the individually driven belts resulted in a "creep," i.e., one belt moving slightly faster than the other, causing the bacon strips maintained therebetween to curl and/or twist. Bacon strips when so curled and/or twisted did not produce a marketable product and therefore usually resulted in waste.

As far as it is known, bacon strips or the like were not heretofore subjected to a preheating operation, as for example by subjecting the bacon strips to a steam spray or bath to preheat the strips to a predetermined temperature prior to the broiling operation and/or to remove the liquified fat from the cooked bacon by evacuation.

OBJECTS

An object of this invention is to provide an apparatus for conveying strips of bacon or the like through a broiling oven on a heat pervious conveyor in a manner which will prohibit curling and/or twisting of the strips.

Another object is to provide an apparatus wherein the bacon strips or the like are subjected to a preheating operation to preheat the bacon strips to a predetermined temperature to facilitate or minimize the broiling or cooking time.

Another object of this invention is to provide an apparatus in which the strips of bacon or the like are subjected to a preheating operation by passing the same through a steam chamber or bath.

Another object of this invention is to effect the removal of the liquified fat or grease from the cooked strips by the conveyance of the broiled strips through a vacuum chamber wherein the liquified grease is evacuated.

Another object of this invention is to provide an apparatus whereby the final removal of any fat or grease on the respective bacon strips is removed by blotting.

Another object of this invention is to provide an apparatus wherein the strips are conveyed through a series of operating stations to sequentially effect the preheating, broiling and removal of the liquified grease or fat therefrom in a continuous and uninterrupted manner.

Another object of this invention is to provide an apparatus wherein a compressive force is applied to the bacon strips during the broiling operation so as to prohibit shrinkage thereof.

Another object of this invention is to provide an apparatus by which the cooking process of bacon strips or the like is greatly speeded up.

Another object of this invention is to provide a cooking apparatus for broiling bacon strips or the like wherein the broiling oven is constructed and arranged so as to facilitate the cleaning thereof.

Another object of the invention is to utilize fluid pressure to effect the removal of the cooked strips, e.g., bacon strips from the conveyor conveying the strips through a cooking oven.

BRIEF SUMMARY OF THE INVENTION

The foregoing objects, and other features and advantages are attained by using an apparatus for broiling strips of meat, as for example bacon, or the like, which comprises the step of effecting the preheating of the strips by subjecting the strips to a steam spray to bring the strips up to a predetermined temperature. The preheated strips are then conveyed through the broiling oven by passing the strips therethrough at a vertical or an acute angle with respect to the vertical, and maintaining the strips under a positive compressive pressure to reduce shrinkage. Thereafter the broiled strips are conveyed through a vacuum chamber and subjected to a zone of negative pressure for effecting the removal therefrom of any liquified fat or grease by evacuation. The bacon strips, upon conveyance through the vacuum chamber are then conveyed in a manner so that the opposite sides thereof are subjected to a blotting operation for removing therefrom additional grease or fat adhering thereto.

The present invention further contemplates an apparatus for mechanically effecting the method described. The apparatus comprises an endless conveyor comprising a heat impervious conveyor belt and an associated complementary heat pervious holding belt comprised of connected frames or panels. The respective belts are operatively connected and driven by a flexible drive means whereby each belt is moved in unison so that the relative linear speed therebetween is maintained substantially zero. Means are provided for effecting relative angular movement between the conveyor belt and the holding belt or frame during the linear movement thereof for sandwiching therebetween the strips of meat or bacon to be broiled. The relative angular movement between the respective conveyor belt and the holding belt is such that the same assume a complementary acute angle with respect to the vertical in passing through successive stations in which the strips are subjected to a preheating, broiling and grease evacuation or removal operation. The conveyors pass through a steam chamber in which the strips are subjected to a preheating operation, i.e., the strips are brought to a predetermined temperature by exposing them to a steam bath or spray. Thereafter the preheated bacon strips are conveyed through a broiling oven comprising of one or more pairs of oven sections defining an oven chamber. The respective oven sections are mounted for lateral movement toward and away from one another to facilitate the cleaning.

Disposed within the oven chamber defined by the complementary sections are a series of pressure bars through which the strip conveyor passes to exert a positive pressure thereon during the broiling operation. The pressure bars are arranged so as to exert a compressive force on the bacon strips conveyed therebetween to prohibit the shrinkage of the strips held between the belts.

Upon moving through the broiling oven, the bacon strips are next conveyed through a vacuum chamber or zone of negative pressure wherein the liquified grease or fat is removed by evacuation. The operation of the conveyor means is such that upon passage through the vacuum chamber the complementary portions of the belt conveyors are angularly moved to an inoperative position to permit the removal of the cooked bacon strips therefrom. Means are provided for effecting positive removal of the strips from the conveyor in the event of sticking. Prior to effecting the removal of the bacon strips from the conveyor, a means is provided for blotting one side of the strips to remove therefrom any further grease or fat adhering thereto. The bacon strips are then conveyed to another conveyor in a manner so that the strips are automatically turned over in passing from the cooking conveyor to the packing conveyor and a second series of blotting rollers is provided to blot the other sides of the strip.

FEATURES

A feature of this invention resides in the provision of an apparatus wherein a plurality of bacon strips are continuously and successively subjected to a preheating, broiling and grease evacuation operation.

Another feature of this invention resides in the provison of an improved conveyor means comprising complementary heat impervious conveyor belts for sandwiching the bacon strips therebetween which are driven so that the relative linear speed therebetween is maintained substantially zero.

Another feature of this invention resides in the provison of an improved oven structure consisting of complementary oven sections which can be moved relative to one another to enhance and expedite the cleaning and/or maintenance thereof.

Another feature of this invention resides in an apparatus for effecting the removal of the liquified grease or fat from the broiled strips by evacuation or negative pressure.

Another feature of this invention resides in the provision of a series of pressure rollers or bars disposed within the broiling oven to maintain a positive compressive force on the bacon strips sandwiched between the conveyor belts and passing therethrough to prohibit any shrinkage thereof.

Other features and advantages will become more readily apparent when considered in view of the drawings and specifications in which:

FIG. 1 is a vertical elevation view illustrating the apparatus embodying the present invention.

FIG. 2 is a detail perspective view of a fragmentary portion of the conveyor means utilized for conveying the strips of material to be broiled through the various operating stations as shown in FIG. 1.

FIG. 3 is a detail sectional view through the broiling oven taken along line 3—3 on FIG. 1.

FIG. 4 is a detail perspective view of the compressive pressure means disposed within the oven.

FIG. 5 is a perspective detail showing of the vacuum chamber through which the bacon strips are conveyed.

FIG. 6 is a perspective detail showing the opposite side of the vacuum chamber.

FIG. 7 is a sectional view taken along line 7—7 on FIG. 1.

FIG. 8 is a detail sectional view taken along line 8—8 of FIG. 1.

FIG. 9 is a fragmentary plan view taken essentially along line 9—9 on FIG. 1.

FIG. 10 is an end view of a modified conveyor means similar to that of FIG. 2 showing two sets of conveyor belts being driven by a single chain or flexible drive.

FIG. 11 is a detail of a modified means for effecting the removal of the cooked strips from the conveyor. FIG. 12 illustrates a fluid actuated means for effecting removal of the strips from another conveying system.

FIG. 13 is a sectional view taken along line 13—13 on FIG. 12.

DETAILED SPECIFICATION

This invention contemplates an apparatus for enhancing and expediting the cooking of strips of comestibles, as for example, bacon strips or the like. The slices, strips of comestible, bacon or the like M are first loaded onto a heat pervious mesh conveyor belt 20 which is cooperatively associated with a heat pervious mesh holding belt 21 so that the respective mesh belts 20-21 sandwich the bacon strips M therebetween in conveying the strips successively through a preheating station P, and a broiling station B, and a grease removing station G. The conveyor belt 20 and holding belt 21, as will be hereinafter described in greater detail, are constructed and arranged so as to be rendered relatively angularly movable with respect to one another to maintain or position the bacon strips M at a desired angle, e.g., an acute angle with respect to the vertical in traveling through their respective operating stations P, B and G. Also the belt construction 20-21, as will be hereinafter described, is such that both the conveyor belt 20 and the associated holding belt 21 are driven in unison so that the relative linear speed therebetween is maintained substantially zero. Maintaining zero relative linear speed between belts 20, 21 prevents any creeping which will otherwise cause curling of the bacon strips disposed therebetween.

The bacon strips M sandwiched between the heat pervious mesh conveyors 20-21 are conveyed through a preheating station P which comprises a steam tunnel. In the steam tunnel the strips of bacon are subjected to a steam spray or bath. Preferably the strips are conveyed therethrough at an acute angle relative to the vertical. The temperature of the steam is such that the steam spray will prehat the bacon or strips M to a predetermined temperature, as for example, a temperature ranging between 175° to 210° F. in passing therethrough. The steam preheated bacon M is then subsequently conveyed through a broiling oven at an acute angle to the vertical wherein the strips are cooked or broiled to a predetermined degree. In passing through the broiling oven a positive compressive force is maintained on the respective mesh conveyor belts to prohibit shrinkage of the bacon strips maintained therebetween. After passing through the broiling oven the respective broiled strips are then conveyed through a vacuum chamber G wherein the liquified fat or grease is evacuated. In passing through the vacuum chamber the respective mesh conveyor belts 20-21 are angularly moved or separated relative to one another whereby the bacon strips may be removed from the holding conveyor. In the event of sticking the strips may be positively removed either by fluid pressure and/or mechanical pressure as by a spiral brush.

Prior to the removal of the bacon strips M from the holding conveyor 20, one side of the bacon is blotted to remove any grease adhering thereto. In effecting the removal of the bacon strips from the holding conveyor the strips are automatically turned over onto another conveyor, and thereby exposing the other side to a blotting operation to remove any grease adhering to the other side. Upon completion of the second blotting operation, the bacon strips are conveyed to a suitable packing station.

Referring to the drawings there is shown therein an apparatus 25 whereby the method described can be mechanically performed. The cooking apparatus 25 comprises a conveyor means 26 for successively conveying the bacon strips M through a preheating station P, a broiling station B, and a grease evacuating station G. The conveyor means 26 comprises an endless flexible drive 27, as for example, a chain drive or timing belt, which is suitably threaded over a pair of spaced sprocket or pulley means 28, 29. It will be understood that at least one of the sprocket or pulley means 28, 29 may be operatively connected to a source of power, as for example, a motor or the like, to impart the drive thereto.

Operatively connected to the flexible drive or chain 27 to be driven thereby is a heat pervious mesh conveyor belt 20 which is adapted to rotate between horizontally disposed positions adjacent the ends thereof to an off vertical position intermediate the ends. Loading of the strips M onto the conveyor belt 20 occurs in the horizontal position at one end and the unloading of the strips therefrom occurs at the opposite end as hereinafter rendered more apparent.

The conveyor belt 20 is formed of interlaced wires to form a flexible mesh structure defining a continuous plane surface coextensive to the length of the drive chain 27. If desired a plurality of transversely extending reinforcing bars or rods 30 may be incorporated in the mesh conveyor belt 20 at spaced intervals therealong.

Cooperatively associated with the mesh conveyor belt 20 is a heat pervious holding belt 21. As shown in FIGS. 1 and 2 the complementary holding belt 21 id defined as a plurality of closely spaced mesh panel sections 21A formed of interlocked wires which together are rendered substantially coextensive the length of the chain 27. The arrangement of the holding belt 21 is such that the respective mesh panel sections 21A thereof are vertically disposed adjacent the opposed ends of the conveyor and operative to be angularly rotated toward the conveyor belt 20.

The respective conveyor belt 20 and the associated holding belt panels 21A are connected to the conveyor drive chain 27 so as to be driven in a linear direction which renders them relatively rotatable with respect to one another. The arrangement is such that the respective conveyor belt 20 and holding belt 21 can rotate toward one another to sandwich the strips therebetween and assume an angle, preferably an acute angle with respect to the vertical for conveying the bacon strips through the respective operating stations P, B and G as will be hereinafter more fully described.

It will be understood that the conveyor means 26 may be provided with a conveyor belt 20 extending to one side of the chain or by having a second conveyor 20A extending to the other side of the chain. In this form a second complementary holding chain 21, similar to that hereinbefore described is operatively associated with belt 20. In this manner the capacity of a single drive chain 27 may be increased. From the arrangement described it will be noted also that the drive of the conveyor belt 20, 20A and the holding belt 21 and 21B is effected by a single chain 27, and consequently each is moved in a linear direction, in unison, at a linear speed differential therebetween of zero. In this manner the respective mesh belts 20, 21 in moving through the preheat P and broiling B stations do so in unison, without relative linear movement occurring therebetween, and thereby prohibiting any curling of the bacon being conveyed thereby.

In advancing toward the preheating station P, means are provided for effecting the relative angular movement of the conveyor belts 20, 21 so that each may assume an acute angle position to the vertical as indicated in FIG. 2. The means for effecting the angular movement of the respective conveyor belts 20, 21 comprises a complementary cam track 32, 33 for receiving the free end of the corresponding belts 20 and 21 respectively. The shape of the respective cam tracks 32, 33 is such that the conveyor belt 20 is moved or twisted from a horizontal position toward the holding belt 21 while the holding belt 21 is moved or twisted toward the conveyor belt 20 so that as the respective conveyor belts 20, 21 advance toward the preheating station P, the respective tracks 32, 33 will cause the belts 20, 21 to close onto the strips M and assume an acute angle with respect to the vertical.

The preheating station P, as seen in FIG. 1, comprises a steam tunnel 34 defined by a pair of opposed side walls 34A, 34B having interconnected top and bottom walls 35 and 36. The end walls 37, 38 of the steam tunnel 34 are provided with openings 37A sized to permit the mesh conveyors to pass therethrough.

Disposed within the steam chamber of the tunnel 34 is a steam manifold 39 which connects to a source of steam supply. Connected to the manifold 39 are a plurality of branch conduits 40, each having a plurality of steam jets 41 arranged to direct a steam spray toward the conveyor belts 20, 21. The arrangement is such that the steam jets 41 will direct a steam spray toward the bacon strips being conveyed through the chamber. The speed of the belts 20, 21 is such so that the resident time of the strips M within the chamber is sufficient to attain the heating of the bacon strips to a temperature ranging between 175 and 210 degrees F. By effecting the preheating of the bacon to a predetermined temperature, the cooking or broiling of the bacon can be expedited as the resident time of the bacon in the broiling oven can be reduced.

Upon passing through the steam chamber or tunnel 34, the bacon strips are conveyed by the conveyor 26 through the broiling oven 45. As best seen in FIGS. 1 and 3 the broiling oven 45 comprises a pair of complementary oven sections 46, 47 which are arranged for movement toward one another. As best seen in FIG. 3, each oven section 46, 47 is constructed to define an oven chamber 48 in the operative position thereof. Each oven section 46, 47 is provided with a heated air space in which suitable heating means 49 are provided for generating the broiling heat. In the illustrated form of the invention it will be noted that the heating means for effecting the broiling operation comprises a plurality of infrared lamps. However, other conventional heating means may be provided.

It is to be noted that the bottom of the oven chamber is opened and is located above a trough 50 for collecting any liquified grease or fat dripping from the bacon strips in passing therethrough. The trough 50 may be formed integral to one of the oven sections, e.g., section 47. See FIG. 3. A deflecting plate 50A is connected to the other section 46 for directing grease drippings to a trough 50.

Each of the respective oven sections 46, 47 is mounted on suitable rollers 51 which suspendedly support the respective oven sections from rails 52 so that the respective oven sections 46, 47 can be laterally moved away from one another to facilitate a cleaning operation.

Located in the oven chamber 48, is a means for effecting a positive compressive force on the bacon strips sandwiched between belts 20 and 21. As best seen in FIGS. 3 and 4 the compressive means comprises a mounting plate 53, 54 mounted and suitably supported on opposite sides of the conveyor means 26 in the oven chamber 48. Resiliently mounted or supported on the mounting plates 53, 54 are a plurality of closely spaced flat compression bars 55. Coil springs or the like 56 maintain the compression bars 55 normally biased toward the conveyor belts 20, 21 to maintain a compressive force thereon. If desired a means, e.g., an adjusting screw or the like may be provided for adjusting the load on the compression springs 56 to vary the compressive force exerted by compression bars 55 on the conveyor belts 20, 21 moving therebetween. By maintaining a compressive force on the belts 20, 21 shrinkage of the strips secured therebetween is minimized.

It will be understood that the broiling station or oven B may be formed of a plurality of pairs of oven sections 46, 47 deposed in tandem to define a broiling oven of any determinate length. In the illustrated form of the invention two such complementary pairs of oven sections 46, 47 are illustrated as being disposed in tandem, each being constructed in the manner described.

Spaced downstreamwise in the direction of travel of the conveyor belts 20, 21, there is provided a vacuum chamber 60 through which the broiled strips may pass. The vacuum chamber 60 is arranged to effect the evacuation of the liquified fat or grease formed on the bacon strips. The vacuum chamber 60 comprises a housing having opposed side walls 61, 62 interconnected by top and bottom walls 63, 64 and end walls 65, the latter being provided with suitable openings 65A disposed in alignment to enable the conveyor means 26 to pass therethrough.

As seen in FIGS. 5 and 6, each side wall 61, 62 of the vacuum chamber 60 is provided with a series of spaced openings 61A, 62A. The openings in the opposite sidewall are disposed so as to be out of alignment so as to not adversely affect the negative pressure to which each opening is subjected. Each of the respective openings 61A, 62A in the side walls of the vacuum chamber is connected by a suitable conduit 65 to a vacuum pump 66 so that when the pump 66 is actuated the liquified grease or fat on the bacon strips is evacuated as the strips pass the zones of negative pressure. The liquified fat drawn off by vacuum pressure is collected in a suitable collector 67 to which conduits 67A connect. Upon passing through the evacuating chamber 60, the guide means or cam tracks 32, 33 are arranged to effect angular movement or twist to the respective mesh conveyors away from one another so that the holding conveyor 21 assumes a substantially vertical position while the conveyor chain 20 assumes a substantially horizontal position as viewed in FIG. 1. A wiping brush 67 having its bristles in spiral convolutions is arranged to brush or move any strips tending to adhere to the surface of the holding conveyor 21. The arrangement is such that the bacon strips M will normally tend to adhere to the conveyor belt 20 as illustrated.

Disposed downstream from the exit end of the evacuating chamber 60 are a series of blotting rollers 68 under which the broiled bacon strips M will pass. The blotting rollers 68 are disposed so as to be in rolling contact with one side of the bacon strips M.

The blotting rollers 68 may comprise simply of a roller or core 71 having rolled thereon a plurality of layers of blotting material or paper 72. The arrangement is such that when the outer layer of blotting material or paper 72 has been saturated with grease or fat, the outer layer is removed to expose the next subjacent layer to provide a new blotting surface. For this reason the blotting rollers 68 are mounted for vertical adjustment so as to adjust the roller surface to rolling engagement with the bacon strip M as successive layers of the blotting material are removed therefrom upon the successive saturation of the outermost layers.

As the horizontal portion of the conveyor belt 21 turns over the end sprocket 29, the bacon strips carried thereby will fall by gravity onto a subjacent packing conveyor 75. As seen in FIG. 2 the packing conveyor 75 is slotted as at 76 for accommodating the vertical holding panels 21 as they turn over the end sprocket 29. In turning over the end sprocket 29, the strips carried on the conveyor belt 20 are transferred or dropped by gravity onto conveyor 75. In doing so the unblotted side is placed face up on the packing conveyor. Operatively associated with the packing conveyor is another series of blotting rollers 77 disposed in rolling engagement with the bacon strips M passing therebeneath to effect a blotting of the excess grease from the other side of the bacon strip M. The blotting rollers 77 associated with the packing conveyor are constructed similarly to that described and will operate in substantially the same manner.

Accordingly each side of the bacon is blotted free of any excess grease of fat. Upon the second blotting operation the bacon strips M are conveyed to a suitable packing station wherein the bacon may be packed or boxed as desired.

FIG. 11 illustrates a modified means for effecting removal of any strips of material M adhering to conveyor belt or frames 21A. As shown in FIG. 11 a jet or nozzle 75 for directing a fluid pressure toward belt 21 is disposed adjacent the conveyor belt 21 to blow off any strips tending to adhere thereto as hereinbefore described. It will be understood that the fluid pressure may comprise compressed air supplied by a suitable source not shown.

The air jets or nozzle 75 may be used in lieu of the spiral brushes 56 and/or may be used in conjunction therewith to insure positive removal of any strips M from belt 21 as the conveyor advances toward the blotting rollers 68.

FIGS. 12 and 13 illustrate the jet or nozzle system of effecting removal of the strips of material M from a modified conveying system. FIGS. 12 and 13 illustrate a fragmentary portion of a conveyor means of a type disclosed in my application Ser. No. 413,846, filed Nov. 25, 1964, now U.S. Pat. No. 3,528,361 utilizing a pair of complementary endless conveyors 80 and 81. The upper flight 80A comprises the support flight for the strips M being conveyed through the respective operating stations. The lower flight 81A functions as the compression belt. It will be understood the conveyors 80 and 81 are formed of heat pervious mesh material, and that each is threaded over suitable end rollers 80C and 81C, of which only one is shown. As shown the compressive force applied by flight 81A of conveyor 81 is released by directing flight 81A away from flight 80A.

Disposed immediately above flight 81A is a nozzle or jet spray pipe 82 for directing a fluid pressure, e. g., compressed air, toward the conveyor flight 81A. Thus any strip M tending to adhere thereto is blown off onto conveyor flight 80A from whence it is carried past blotting roller 84 as hereinbefore described.

In the event the strip M is adhered to conveyor flight 81A so firmly that it can not be dislodged by air pressure alone, a spiral wiping brush 85 is disposed adjacent end sprocket 81C to mechanically clean or wipe the strip M from conveyor 81 as it turns over end roller or sprocket 81C.

Similarly with the lower oven conveyor 80, a like nozzle or jet spray pipe 87 may be disposed between flights 80A, 80B of conveyor 80 for directing a fluid pressure toward flight 80B. Thus, any strip tending to adhere thereat will be blown onto the packing conveyor 88.

As hereinbefore described, strips conveyed from blotting roller 84 will be automatically turned over as they are transferred onto the packing conveyor 88. Associated with the packing conveyor 88 is another blotting roller 85 to blot the grease from the other side of strips M.

While the instant invention has been described with respect to particular embodiments thereof it will be readily understood that variations and modifications may be made without departing from the spirit or scope of the invention.

What is claimed is:

1. A cooking apparatus for broiling strips of bacon or the like comprising a preheating oven means,
a broiling oven means,
a conveyor means for successively conveying said strips through said preheating oven and said broiling oven,
means for removing the excess liquified grease or fat from said broiled strips,
said preheating oven means includes means for preheating said strips by subjecting said strips to a steam bath to heat said strips to a predetermined preheated temperature,
said preheating means including a series of steam nozzles for subjecting said strips to a steam spray.

2. The invention as defined in claim 1 wherein said conveyor means comprises an endless flexible drive means,
means for effecting the drive of said flexible drive means,
a heat pervious mesh conveyor belt operatively connected to said flexible drive means, and
a complementary previous mesh holding belt operatively connected to said flexible drive means whereby said conveyor belt and holding belt are moved in unison so that the relative linear speed therebetween is maintained substantially zero, and
means for effecting relative angular displacement between said belts to sandwich said strips therebetween.

3. The invention as defined in claim 2 wherein said flexible drive means comprises a chain.

4. The invention as defined in claim 3 wherein said holding belt includes a plurality of belt sections closely spaced along the length of said chain.

5. The invention as defined in claim 4 wherein said conveyor belt is disposed substantially horizontal adjacent the end portions of said flexible drive means, and said holding belt is disposed substantially normal thereto at said end portions,
and means for effecting relative angular displacement between said belts intermediate the said end portions of said flexible conveyors.

6. The invention as defined in claim 5, said latter means operate on each of said conveyor belts and holding belts to effect the respective displacement thereof toward one another whereby said belts sandwich and maintain said strips in position therebetween at an acute angle to the vertical as said conveyor means passes through said preheating and broiling ovens.

7. the invention as defined in claim 6 wherein said latter means includes a cam track operating on said conveyor belt and holding belt.

8. The invention as defined in claim 3 wherein said conveyor belt comprises a continuous length substantially coextensive the length of said flexible drive means.

9. The invention as defined in claim 2 and including means for wiping strips off said holding belt upon the separation of said belts to effect the removal of said cooked strips.

10. The invention as defined in claim 9 and including a blotting roller for blotting the excess grease or fat from the cooked strips on said conveyor belt.

11. The invention as defined in claim 10 and including a take-off conveyor disposed adjacent the end of said first mentioned conveyor means, said take-off conveyor having one end disposed adjacent to and below the end of said first mentioned conveyor means to receive the cooked strips from said first mentioned conveyor means.

12. The invention as defined in claim 11 and including a blotting roller operatively associated with said take-off conveyor to blot the grease or fat from the other side of the cooked strips.

13. The invention as defined in claim 9 wherein said wiping means comprises a nozzle means for directing a fluid pressure toward said holding belt to effect the release of any strips tending to adhere thereto.

14. The invention as defined in claim 9 wherein said wiping means includes a brush to mechanically clean any strips tending to adhere to said holding belt.

15. A cooking apparatus for broiling strips of bacon or the like comprising a preheating oven means,
a broiling oven means,
a conveyor means for successively conveying said strips through said preheating oven and said broiling oven,
means for removing the excess liquified grease or fat from said broiled strips,
said means for removing excess fat or grease from said strips includes a vacuum tunnel, and
means operatively associated with said tunnel for creating a negative pressure therein whereby the liquified fat or grease is evacuated from said strips as said strips are conveyed through said tunnel.

16. The invention as defined in claim 15 and including a series of blotting rollers for directly blotting any excess fat from the surface of said strips subsequent to passage through said vacuum tunnel.

17. The invention as defined in claim 16 wherein said conveyor means includes a plurality of reinforcing means spaced at intervals therealong.

18. A cooking apparatus for broiling strips of bacon or the like comprising
a preheating oven means,
a broiling oven means,
a conveyor means for successively conveying said strips through said preheating oven and said broiling oven,
and means for removing the excess liquified grease or fat from said broiled strips,
said broiling oven includes
a pair of complementary oven sections to define an oven chamber,
means for mounting said oven sections for relative movement toward and away from one another between an operative and inoperative position,
means disposed in each oven section to generate a broiling heat,
and means disposed in said oven chamber for exerting a compressive force on said conveyor belt and holding belt as the same advances through said oven chamber.

19. The invention as defined in claim 18 wherein said compression means includes a series of compression bars operating on said belts to transmit a compressive force on the strips sandwiched between said belts.

20. A cooking apparatus for broiling strips of bacon of the like comprising
a preheating oven means,
a broiling oven means,
a conveyor means for successively conveying said strips through said preheating oven and said broiling oven,
and means for removing the excess liquified grease or fat from said broiled strips,
said conveyor means comprises
an endless flexible drive means,
means for effecting the drive of said drive means,
a heat pervious mesh conveyor belt connected to said flexible drive means to extend to either side thereof,
a corresponding heat pervious mesh holding belt operatively connected to said flexible drive means to complement the conveyor mesh belt extending to either side of said drive means whereby each of the respective conveyor belts and corresponding complementary holding belts are moved in unison so that the relative linear speed therebetween is maintained substantially zero,
and means for effecting relative angular displacement between the corresponding complementary conveyor belt and holding belt.

21. The invention as defined in claim 20 wherein said latter means includes a cam track operating on the respective conveyor belts and holding belts whereby the conveyor belts rotate between a substantially horizontal position and an acute angle relative to the vertical and said complementary holding belt is rotated between said acute angle position and a substantially vertical position.

22. An apparatus for broiling strips of bacon or the like comprising:
a conveyor means,
said conveyor means including an endless flexible drive chain,
a heat pervious mesh conveyor belt operatively connected to said chain,
a heat pervious complementary holding belt operatively connected to said chain,
means for effecting the drive of said chain to move said conveyor belt and holding belt in unison so that the relative linear movement therebetween is maintained substantially zero,
cam track operatively associated with said conveyor belt and holding belt to effect relative angular displacement for sandwiching said strips therebetween,
means for preheating said strips,
said preheating means including a preheat tunnel,
means within said tunnel for steam preheating said strips conveyed therethrough to a predetermined temperature,
a broiling oven disposed downstreamwise from said preheating oven,
said broiling oven including a pair of complementary oven sections defining an oven chamber,
means for mounting the respective oven chambers for relatively lateral movement,
a heat generating means disposed within each of said oven sections to impart a broiling heat on said strips conveyed therethrough,
means disposed in said oven camber for effecting a compressive force on said conveyor belt and complementary holding belt to prohibit shrinkage of said strips during broiling,
said cam means guiding said conveyor belt and complementary belt through said tunnel and broiling oven at an acute angle with respect to the vertical,
means defining a vacuum chamber downstreamwise from said broiling oven,
means operatively associated with said vacuum chamber for drawing a negative pressure thereon for evacuating any excess liquified fat or grease from said strips as said strips are conveyed therethrough,
means disposed downstreamwise of said vacuum chamber for removing any strips adhering to the holding belt upon the separation of said holding belt from said conveying belt, and
means for blotting the sides of said broiled strips to remove the grease or fat therefrom.

23. A conveyor means for conveying strips of comestible materials through a cooking oven comprising, a first conveyor means,
a second endless heat pervious conveyor means,
said second conveyor means complementing said first conveyor means to maintain said strip in compression therebetween in passing through a cooking oven,
means for releasing the compressive force on said strips between said conveyor means,
and fluid pressure means operatively associated with said conveyor means to release any strips tending to adhere to one of said conveyor means.

* * * * *